(12) United States Patent
Ahn

(10) Patent No.: US 7,094,980 B2
(45) Date of Patent: Aug. 22, 2006

(54) SCROLL KEY HAVING A FUNCTION SELECTING SWITCH

(75) Inventor: Kyoung-Jin Ahn, Suwon-si (KR)

(73) Assignee: Samsung Electronics Co., LTD., Suwon-Si (KR)

( * ) Notice: Subject to any disclaimer, the term of this patent is extended or adjusted under 35 U.S.C. 154(b) by 0 days.

(21) Appl. No.: 11/046,744

(22) Filed: Feb. 1, 2005

(65) Prior Publication Data

US 2005/0199477 A1    Sep. 15, 2005

(30) Foreign Application Priority Data

Mar. 10, 2004  (KR) .................... 10-2004-0016023

(51) Int. Cl.
  *H01H 3/00*  (2006.01)
(52) U.S. Cl. ................... 200/18; 200/11 TW
(58) Field of Classification Search .............. 200/4, 200/5 R, 14, 17 R, 18, 11 TW; 341/22, 20, 341/35, 160, 163
See application file for complete search history.

(56) References Cited

U.S. PATENT DOCUMENTS

| | | | |
|---|---|---|---|
| 2,791,648 A * | 5/1957 | Maloney | 200/18 |
| 6,194,673 B1 * | 2/2001 | Sato et al. | 200/4 |
| 6,198,057 B1 * | 3/2001 | Sato et al. | 200/19.18 |
| 6,271,488 B1 * | 8/2001 | Sasaki | 200/4 |
| 6,291,782 B1 * | 9/2001 | Isikawa | 200/14 |
| 6,333,473 B1 * | 12/2001 | Sawada et al. | 200/4 |
| 6,340,801 B1 * | 1/2002 | Fukuda et al. | 200/18 |
| 6,388,212 B1 * | 5/2002 | Ishihara et al. | 200/18 |
| 6,774,322 B1 * | 8/2004 | Morinishi et al. | 200/5 R |
| 6,809,275 B1 * | 10/2004 | Cheng et al. | 200/14 |

FOREIGN PATENT DOCUMENTS

| | | |
|---|---|---|
| JP | 10-2000-0055257 | 9/2002 |
| KR | 10-210227 | 4/1999 |
| KR | 10-237554 | 10/1999 |
| KR | 10-317788 | 12/2001 |

* cited by examiner

*Primary Examiner*—Michael Friedhofer
*Assistant Examiner*—Lisa Klaus
(74) *Attorney, Agent, or Firm*—Roylance, Abrams, Berdo & Goodman LLP

(57) ABSTRACT

Disclosed is a scroll key integrally formed with a function selecting switch that selects one of at least two functions. The scroll key comprises a circuit board having a circuit provided for a predetermined function, a vertical rotation switch mounted on the circuit board with a rotation axis thereof being substantially parallel with the circuit board, first and second tact switches mounted on the circuit board in alignment with the rotation axis of the vertical rotation switch, a rotation knob rotating between the vertical rotation switch and the first tact switch in substantially perpendicular relation to the circuit board to rotate the vertical rotation switch and press the first tact switch, and a button mounted on the circuit board to press the second tact switch. Accordingly, a small-sized scroll key can be implemented and assembling of the scroll key is improved.

13 Claims, 4 Drawing Sheets

SCROLL KEY HAVING A FUNCTION SELECTING SWITCH

CROSS-REFERENCE TO RELATED APPLICATIONS

This application claims the benefit under 35 U.S.C. §119(a) of Korean Patent Application No. 2004-16023, entitled "SCROLL KEY HAVING A FUNCTION SELECTING SWITCH" filed Mar. 10, 2004, in the Korean Intellectual Property Office, the entire contents of which are expressly incorporated herein by reference.

BACKGROUND OF THE INVENTION

1. Field of the Invention

The present invention relates to a scroll key for performing a scroll function, such as scrolling through menus in portable electronic devices. More particularly, the present invention relates to a scroll key integrally comprising therein a function selecting switch that can scroll menus and also select a function to, for example, scroll other menus.

2. Description of the Related Art

Portable electronic devices, such as camcorders, usually comprise a scroll key capable of performing both a scroll function and an enter function. The scroll function is for moving a cursor, on a display screen, for selecting one of various functions of menus displayed on the display screen, and the enter function is for confirming a specific menu choice that the cursor indicates. A function selecting switch may be further adapted to select one from two predetermined functions. FIG. 1 shows an exemplary switch assembly having the scroll key and the function selecting switch.

Referring to FIG. 1, a conventional switch assembly 1 having a scroll key comprises a circuit board 3 on which a predetermined circuit is formed, a scroll key switch 10 having both the scroll function and the enter function, a tact switch 20, which is the function selecting switch for conversion of functions to scroll, and a button 21 for pressing the tact switch 20.

The scroll key switch 10 comprises a rotation knob 11 rotating about an axis 12 that can be pressed toward the axis 12 by a certain distance, and a body part 13 supporting the rotation of the rotation knob 11, thereby performing the scroll function. The body part 13 also performs the enter function when the rotation knob 11 is pressed toward the axis 12. The scroll key switch 10 is mounted on the circuit board 3 in such a manner that the rotation axis 12 is perpendicular to the circuit board 3, and such that the rotation knob 11 can rotate parallel with the circuit board 3.

The tact switch 20 is fixed onto the circuit board 3, and is typically disposed below the scroll key switch 10. The button 21 is used to press the tact switch 20, and is fixed separately on an outer part, such as a casing 40, of a part where the switch assembly 1 is mounted, such that one end of the button 21 can press the tact switch 20. A connector 30 is used to connect the switch assembly 1 to a controller (not shown) of the portable electronic device, such as the camcorder.

Operation of the above-structured switch assembly having the scroll key will be described hereinbelow.

For the purpose of this discussion, the switch assembly 1 having the scroll key is assumed to be used as a manual focusing key and a menu selection key. The manual focusing key manually controls the focus of a lens in the camcorder, and the menu selection key selects the menu on the screen displayed on the display panel.

When a user wants manual control of focus of the camcorder lens, the user can press button 21. The controller perceives the scroll key switch 10 to be the manual focusing key, and the user can then focus the lens by rotating clockwise and counter-clockwise the rotation knob 11 of the scroll key switch 10.

If the user wants to select a specific menu in the menu screen displayed on the display panel, the user re-presses button 21. The controller then perceives the scroll key switch 10 to be the menu selection key for moving the cursor. By rotating the rotation knob 11 of the scroll key switch 10, the cursor for selecting the menu is moved from one menu to another menu. The moving direction of the cursor is determined by the rotating direction of the rotation knob 11. After placing the cursor on a desired menu by rotating the rotation knob 11, if the user presses the rotation knob 11, the enter function is performed to confirm selection of the desired menu. The button 21 is used for selecting a desired function, and the scroll key switch 10 is used for performing the scroll function with respect to the selected function.

In the conventional switch assembly 1 having the scroll key, however, the rotation knob 11 of the scroll key switch 10 is mounted parallel with the circuit board 3. The button 21 for pressing the tact switch 20 is mounted on a separate part. Therefore, miniaturization of the portable electronic device becomes difficult. Furthermore, the separately mounted button 21 for the tact switch 20 is not space-effective, making assembly of the conventional switch assembly more difficult.

SUMMARY OF THE INVENTION

An aspect of the present invention is to solve at least the above problems and/or disadvantages and to provide at least the advantages described below. Accordingly, an aspect of the present invention is to provide a scroll key having a function selecting switch, which is miniaturized by integrating a rotation knob and a tact switch, in which the rotation knob rotates perpendicularly to a circuit board and the tact switch is in alignment with the rotation knob to select functions.

Another aspect of the present invention is to provide a scroll key having a function selecting switch, which is space-effective as a portable electronic device and easy to assemble.

In order to achieve the above-described aspects of the present invention, there is provided a scroll key having a function selecting switch, comprising a circuit board having a circuit provided for a predetermined function, a vertical rotation switch mounted on the circuit board with a rotation axis thereof being substantially parallel with the circuit board, and first and second tact switches mounted on the circuit board in alignment with the rotation axis of the vertical rotation switch. The scroll key according to an embodiment of the present invention further comprises a rotation knob rotatably disposed between the vertical rotation switch and the first tact switch substantially in perpendicular relation to the circuit board to rotate the vertical rotation switch and press the first tact switch, and a button mounted on the circuit board to press the second tact switch. The button has at one side a guide part fixed on the circuit board to guide the rotation and vertical movement of the rotation knob. The guide part of the button is fixed by fusing on the circuit board by using a fixing projection formed at a lower part thereof.

In order to achieve another aspect of the present invention, there is provided a scroll key having a function selecting switch, comprising a base board, a flexible printed circuit (FPC) placed on the base board and having a circuit of a special function, a vertical rotation switch mounted on the FPC in a manner that a rotation axis thereof is parallel with the base board, a rotation knob of which one end is mounted on the rotation axis of the vertical rotation switch to rotate the vertical rotation switch, and a rotation shaft that protrudes at the opposite end, and a first tact switch mounted on the FPC to be disposed under the rotation shaft of the rotation knob. The scroll key according to another embodiment of the present invention further comprises a holder mounted on the FPC to support the rotation of the rotation shaft above the first tact switch and enable the rotation shaft to press the first tact switch, a second tact switch mounted on the FPC to be aligned with the first tact switch, and a button mounted on the FPC to press the second tact switch.

The button according to an embodiment of the present invention comprises a fixing part fixed between the holder and the rotation knob on the FPC and a press part extended from the fixing part to press the second tact switch. The holder and the fixing part of the button are fixed on the base board in a manner that fixing projections respectively formed at lower parts thereof penetrate the FPC and the base board and are fused. The vertical rotation switch has a polygonal hole in the center, and the rotation knob has a rotation shaft at one end corresponding to the hole. The hole of the vertical rotation switch has a hexagonal shape.

The second tact switch according to an embodiment of the present invention is used as the function selecting switch for selecting one from at least two predetermined functions, and the vertical rotation switch performs a scroll function as selected by the second tact switch. The first tact switch performs an enter function for confirming one of menus scrolled by the vertical switch.

BRIEF DESCRIPTION OF THE DRAWING FIGURES

The above aspect and other features of the present invention will become more apparent by describing in detail exemplary embodiments thereof with reference to the attached drawing Figures, wherein.

DETAILED DESCRIPTION OF EXEMPLARY EMBODIMENTS

Figure 1:
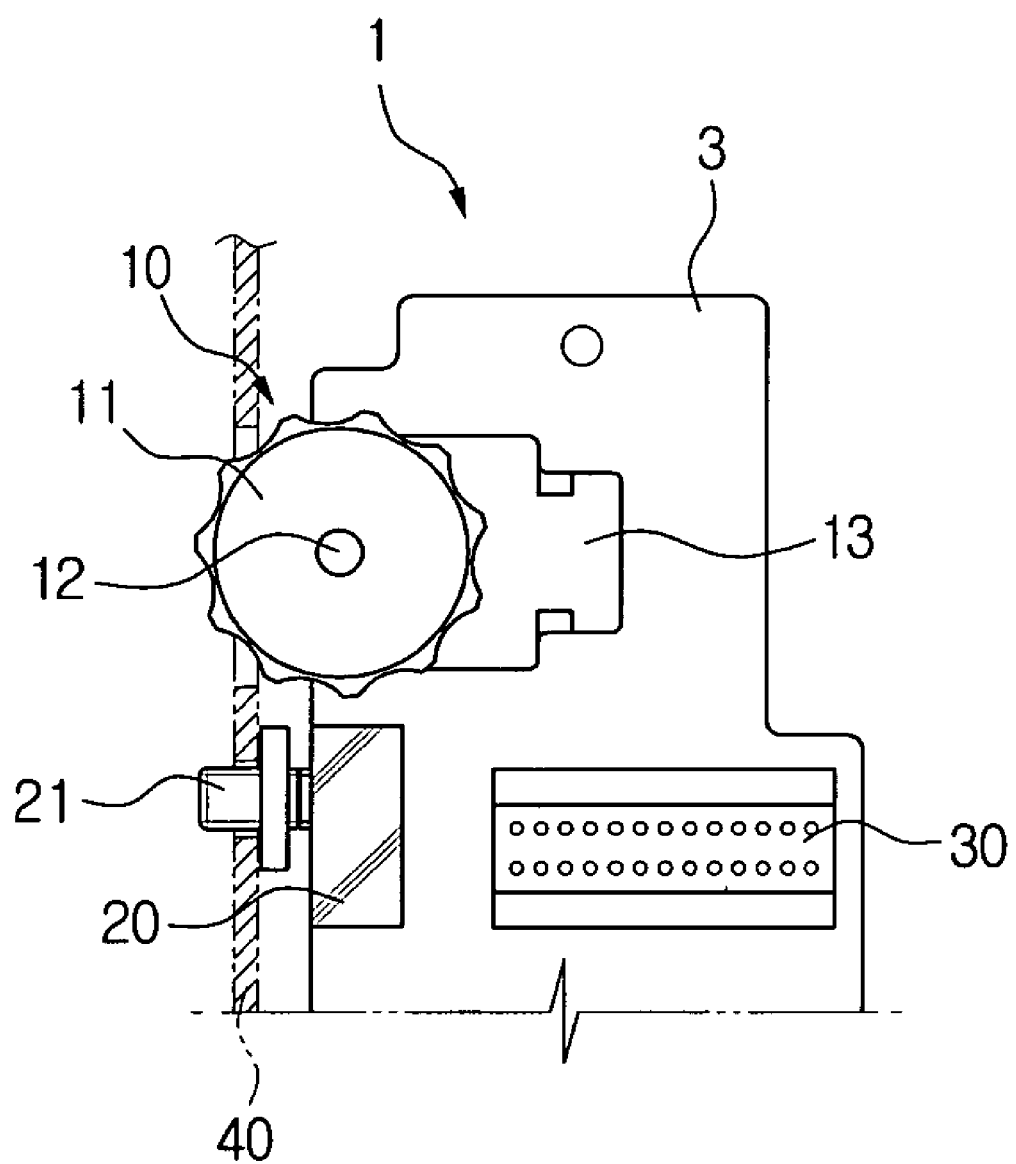
FIG. 1 shows a conventional switch assembly in which a scroll key comprises a function selecting switch.

Exemplary embodiments of the present invention will now be described in detail with reference to the annexed drawings. In the drawings, the same or similar elements are denoted by the same reference numerals throughout the drawings. In the following description, a detailed description of known functions and configurations incorporated herein have been omitted for conciseness and clarity.

Figure 2:
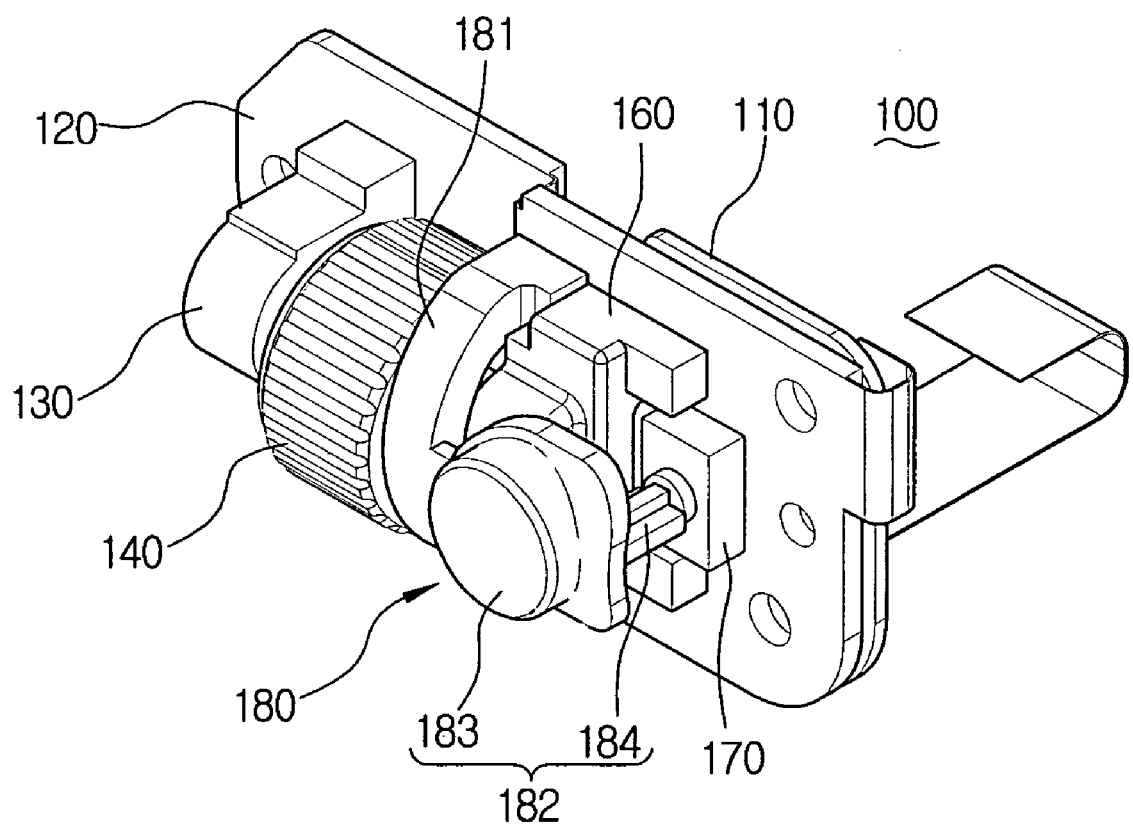
FIG. 2 is a perspective view of a scroll key having a function selecting switch according to an embodiment of the present invention.
Figure 3:
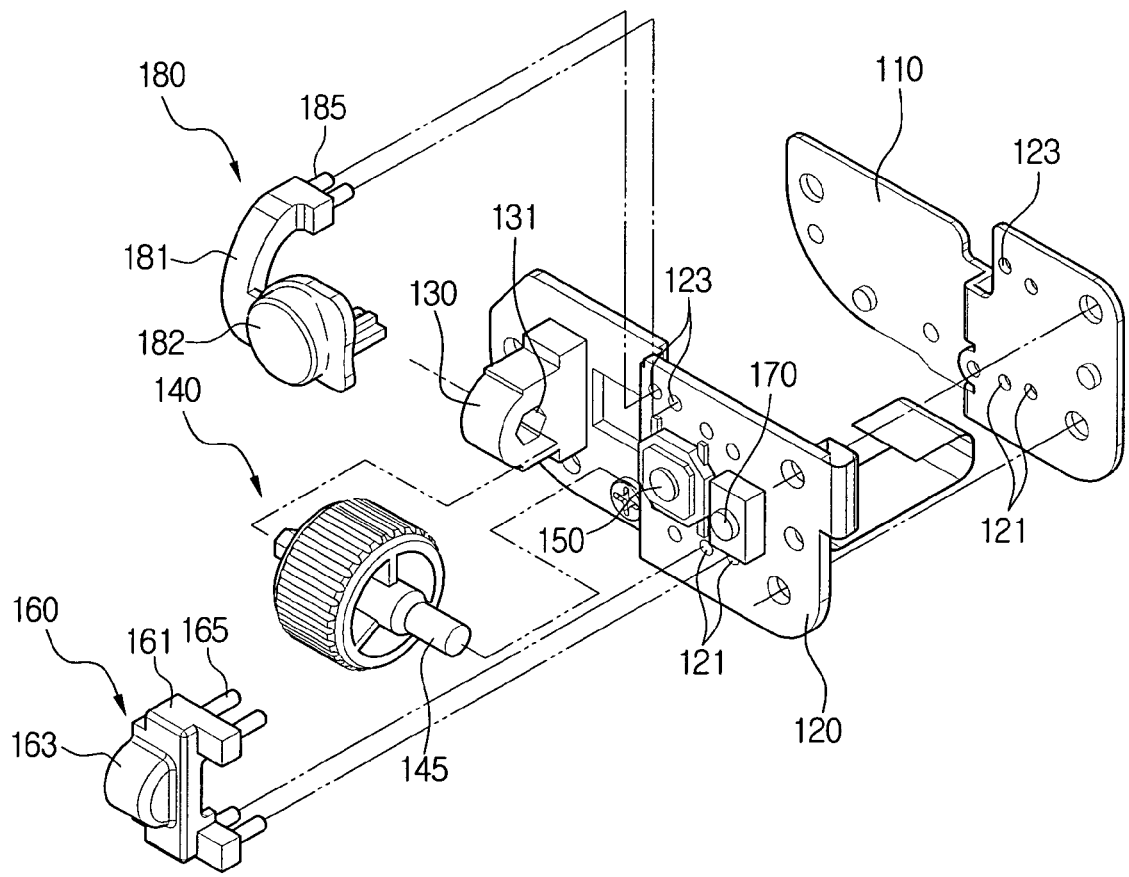
FIG. 3 is an exploded perspective view of the scroll key having the function selecting switch of FIG. 2.

FIG. 2 is a perspective view of a scroll key having a function selecting switch according to an embodiment of the present invention, and FIG. 3 is an exploded perspective view of the scroll key having the function selecting switch of FIG. 2. Referring to FIGS. 2 and 3, the scroll key 100 having a function selecting switch according to an embodiment of the present invention comprises a base board 110, a flexible printed circuit (FPC) 120, a vertical rotation switch 130, a rotation knob 140 for rotating the vertical rotation switch 130, a first tact switch 150 pressed by the rotation knob 140, a holder 160 supporting the rotation of the rotation knob 140, a second tact switch 170 for selecting functions, and a button 180 for pressing the second tact switch 170.

The base board 110 serves as a body for the scroll key 100 having a function selecting switch. The base board 110 is made of a sturdy material and comprises a fixing hole for connection with another device, such as a portable electronic device.

The FPC 120 is a special-function circuit formed on a flexible material. The FPC 120 is assembled on the base board 110. On the FPC 120, the vertical rotation switch 130, the first tact switch 150 and the second tact switch 170 are connected in line.

The vertical rotation switch 130 for performing a scroll function is attached on the FPC 120 in a manner that a rotation axis thereof is substantially parallel with the surface of the FPC 120. The vertical rotation switch 130 includes a polygonal hole 131, preferably a hexagonal hole, in the center for connection with the rotation knob 140. The vertical rotation switch 130 has the same structure as other general switches having the scroll function, as one skilled in the art can appreciate, and therefore a detailed description thereof will be omitted.

Figure 4:
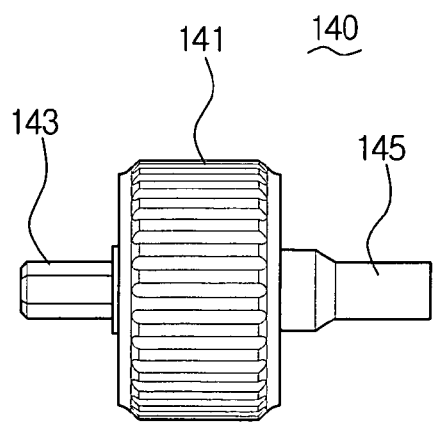
FIG. 4 is a view of a rotation knob of the scroll key having the function selecting switch of FIG. 2.

The rotation knob 140, as shown in FIG. 4, comprises a knob body 141, and first and second rotation shafts 143 and 145 that protrude on the opposite sides of the knob body 141. The first shaft 143 formed on one side of the rotation knob 140 is shaped corresponding to the polygonal hole 131 of the vertical rotation switch 130 for connection with the vertical rotation switch 130. In an embodiment of the present invention, the polygonal hole 131 is preferably shaped as a hexagon, and the shaft 143 has a hexagonal cross-section corresponding to the polygonal hole 131. The second shaft 145 on the opposite side of the rotation knob 140 has a circular section so that the rotation of the knob body 141 is supported by the holder 160.

The first tact switch 150 is mounted on the FPC 120 to be disposed under the shaft 145 of the rotation knob 140. As the rotation knob 140 is pressed, the first tact switch 150 is pressed by the rotation knob 140. The holder 160 supports the rotation of the second shaft 145 of the rotation knob 140 above the first tact switch 150 and also supports vertical movement of the shaft 145 as the knob body 141 of the rotation knob 140 is pressed. A fixing projection 165 is formed at a lower portion of the holder 160. As shown in FIG. 3, the holder 160 comprises a leg part 161 to be fixed on the FPC 120, a guide part 163 supporting the rotation and the vertical movement of the rotation knob 140. The FPC 120 and the base board 110 respectively have fixing holes 121 corresponding to the fixing projection 165. By passing the fixing projection 165 of the holder 160 through the fixing hole 121 and fusing the fixing projection 165, the holder 160 and the FPC 120 are fixed on the base board 110 together.

Figure 6:
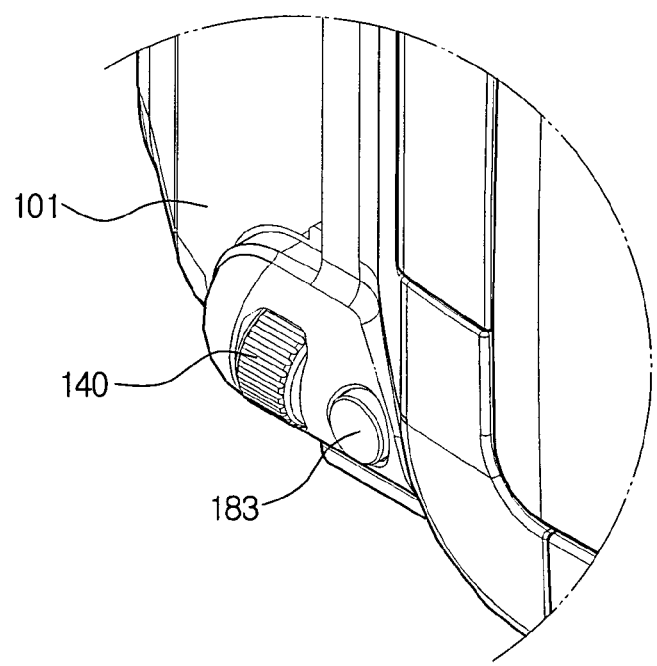
FIG. 6 is a partial perspective view showing the scroll key of FIG. 5 having the function selecting switch being mounted in a portable electronic device.

The second tact switch 170 is aligned with the rotation knob 140 and the first tact switch 150, on the FPC 120, and pressed by the button 180 fixed on the base board 110. The button 180 comprises a button fixing part 181 to be fixed on the base board 110 and a button press part 182 extended from the top of the button fixing part 181 to press the second tact switch 170. The button fixing part 181 is interposed between the rotation knob 140 and the leg part 161 of the holder 160 to minimize the size of the scroll key 100. The button press part 182 comprises a touch surface 183 exposed out of a casing 101 (as shown in FIG. 6) for a user to press, and a pressing projection 184 (shown in FIG. 2) for pressing the second tact switch 170 as the touch surface 183 is pressed. A button fixing projection 185 is formed at a bottom portion of the button fixing part 181, and a fixing hole 123 is formed on the FPC 120 and the base board 110 corresponding to the button fixing projection 185. By passing the button fixing projection 185 through the fixing hole 123 formed on the FPC 120, and the base board 110, and fusing the button fixing projection 185, the button 180 and the FPC 120 are fixed on the base board 110 together.

According to an embodiment of the present invention as structured above, the scroll key 100 that has a function selecting switch can be easily mounted in portable electronic devices by mounting only the base board 110. The scroll key 100 can be easily mounted because the rotation switch 130, the first and the second tact switches 150 and 170, and the button 180 for operating the second tact switch 170 are integrally formed on the base board 110.

Referring now to FIG. 6, operation of the scroll key having a function selecting switch according to an embodiment of the present invention will now be described. When the touch surface 183 of the button 180, that is exposed out of the casing 101 of the portable electronic device is pressed, the pressing projection 184 (FIG. 2) moves down, thereby pressing the second tact switch 170. The second tact switch 170, being pressed, transmits a predetermined signal to the controller (not shown). The rotation knob 140 can smoothly rotate due to its first and second shafts 143, 145 that are respectively supported by the vertical rotation switch 130 and the holder 160. Also, since the rotation knob 140 is supported at both sides, the size of the knob body 141 of the rotation knob 140 can be selected according to the user's convenience and the size of the device. When the user presses the rotation knob 140, the second shaft 145 that is disposed above the first tact switch 150 moves down, thereby pressing the first tact switch 150. Accordingly, the controller perceives that the enter function has been performed.

Operation of the scroll key 100 having a function selecting switch, as described above and as mounted in a camcorder and used for manual focusing and a menu selection key, will be described hereinbelow. When the user wants to manually focus the camcorder lens, the user presses the touch surface 183 of the button 180 that is exposed out of the camcorder casing 101, as shown in FIG. 6. Then, the controller perceives the vertical rotation switch 130 to be the manual focusing key that focuses the camcorder lens. Therefore, by rotating the rotation knob 140 that is engaged with the rotation switch 130, the user can focus the camcorder lens.

If the user wants to select a specific menu in the menu screen displayed on the display panel, the user re-presses the touch surface 183 of the button 180. This time, the controller perceives the vertical rotation switch 130 to be the menu selection key for moving the cursor. By rotating the rotation knob 140 engaged with the vertical rotation switch 130, the cursor for selecting menus is moved from one menu to another menu. The moving direction of the cursor is determined by the rotating direction of the rotation knob 140. For selection of a certain menu, the user places the cursor on a desired menu by rotating the rotation knob 140 and presses the rotation knob 140, and therefore, the enter function is performed to confirm the selection of the menu. Thus, the touch one 183 of the button 180 is used to select one of either the manual focusing function or the menu selecting function, and the rotation knob 140 is for performing the scroll function that corresponds to the selected function.

Figure 5:
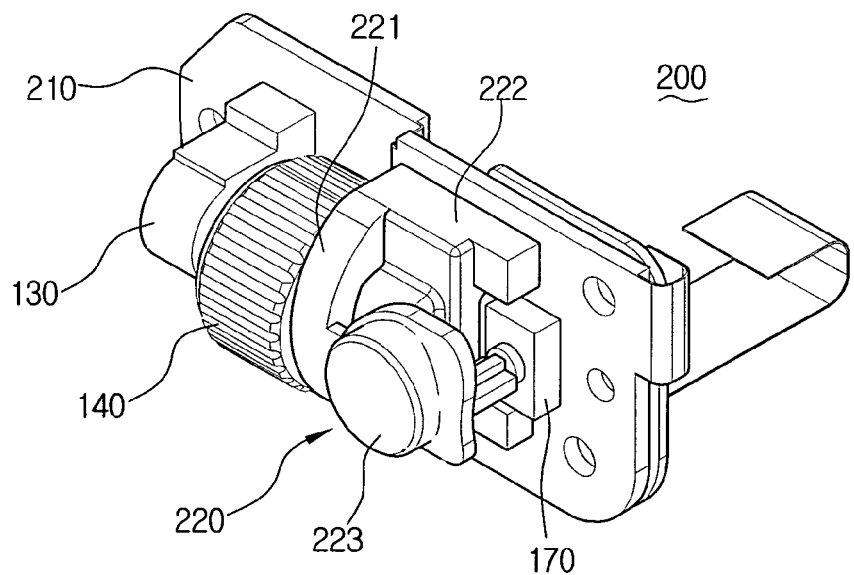
FIG. 5 is a perspective view of a scroll key having a function selecting switch according to another embodiment of the present invention.

FIG. 5 is a perspective view of a scroll key having a function selecting switch according to another embodiment of the present invention. Referring to FIG. 5, a scroll key 200 comprises a circuit board 210, the vertical rotation switch 130, the rotation knob 140 for rotating the vertical rotation switch 130, the first tact switch 150 (not shown) pressed by the rotation knob 140, the second tact switch 170 for selecting functions, and a holder button 220 for supporting rotation of the rotation knob 140 and pressing the second tact switch 170.

The circuit board 210 is an integration of the base board 110 and the FPC 120 of the previous embodiment described above. The circuit board 210 comprises a general printed circuit board (PCB) of a sturdy material, and a special-functioned circuit formed on the PCB. On the circuit board 210, the vertical rotation switch 130, the first and the second tact switches 150 and 170 are mounted in-line. The holder button 220, which is an integral form of the holder 160 and the button 180 of the previous embodiment, comprises a guide part 221 supporting the rotation and the vertical movement of the rotation knob 140, a leg part 222 fixing the holder button 220 on the circuit board 210 so that the guide part 221 is disposed above the first tact switch 150, and a press part 223 formed opposite to the guide part 221 to press the second tact switch 170. The leg part 222 has a fixing projection at a lower portion thereof such that the holder button 220 can be fusedly mounted on the circuit board 210. Also, general fastening members, such as a bolt, for fixing an electronic part on a circuit board may be used to fix the holder button 220 on the circuit board 210. The vertical rotation switch 130, the rotation knob 140, the first and the second switches 150 and 170 are the same in the structure and the operation as in the previous embodiment, and therefore, they will not be described in detail.

Although switches in respectively separate casings have been discussed as examples for the vertical rotation switch 130, the first tact switch 150 and the second tact switch 170, each switch can be received in one casing to implement the scroll key having a function selecting switch according to an embodiment of the present invention.

As can be appreciated from the above description of the present invention, the rotation knob 140 rotates perpendicularly to the circuit board 210, and the tact switches 150 and 170 for selecting a function are integrally formed with the base board 110 and aligned with the rotation knob 140. Consequently, the scroll key having a function selecting switch can be miniaturized. Further, according to the embodiments of the present invention, due to the integral structure of the tact switches 150, 170 and the buttons for pressing the tact switches, the portable electronic device can be designed with a similar frame and more easily assembled and well assembled.

While the invention has been shown and described with reference to certain embodiments thereof, it will be understood by those skilled in the art that various changes in form and details may be made therein without departing from the spirit and scope of the invention, as defined by the appended claims.

What is claimed is:

1. A scroll key having a function selecting switch, comprising:
    a circuit board having a circuit provided for a predetermined function;
    a vertical rotation switch mounted on the circuit board with a rotation axis thereof being substantially parallel with the circuit board;
    first and second tact switches mounted on the circuit board in alignment with the rotation axis of the vertical rotation switch;
    a rotation knob rotatably disposed between the vertical rotation switch and the first tact switch substantially in perpendicular relation to the circuit board to rotate the vertical rotation switch and press the first tact switch; and
    a button mounted on the circuit board to press the second tact switch,
        wherein the button comprises a button fixing part interposed between the rotation knob and the button.

2. The scroll key having a function selecting switch of claim 1, wherein the button further comprises:
    a guide part at one side fixed on the circuit board to guide the rotation and vertical movement of the rotation knob.

3. The scroll key having a function selecting switch of claim 2, wherein the guide part of the button is fixed by fusing on the circuit board by using a fixing projection formed at a lower part thereof.

4. The scroll key having a function selecting switch of claim 1, wherein the vertical rotation switch has a substantially polygonal hole in the center, and the rotation knob has a rotation shaft at one end corresponding to the hole.

5. The scroll key having a function selecting switch of claim 4, wherein the hole of the vertical rotation switch has a substantially hexagonal shape.

6. The scroll key having a function selecting switch of claim 1, wherein the second tact switch is used as the function selecting switch for selecting one from at least two predetermined functions, the vertical rotation switch performs a scroll function as selected by the second tact switch, and the first tact switch performs an enter function for confirming one of menus scrolled by the vertical switch.

7. A scroll key having a function selecting switch, comprising:
    a base board;
    a flexible printed circuit (FPC) placed on the base board and having a circuit provided for a predetermined function;
    a vertical rotation switch mounted on the FPC with a rotation axis thereof being substantially parallel with the base board;
    a rotation knob of which one end is mounted on the rotation axis of the vertical rotation switch to rotate the vertical rotation switch, and a rotation shaft that protrudes at the opposite end;
    a first tact switch mounted on the FPC to be disposed under the rotation shaft of the rotation knob;
    a holder mounted on the FPC to support the rotation of the rotation shaft above the first tact switch and enable the rotation shaft to press the first tact switch;
    a second tact switch mounted on the FPC to be aligned with the first tact switch; and
    a button mounted on the FPC to press the second tact switch,
        wherein the button comprises a button fixing part interposed between the rotation knob and the button.

8. The scroll key having a function selecting switch of claim 7, wherein the button further comprises:
    a fixing part fixed between the holder and the rotation knob on the FPC; and
    a press part that extends from the fixing part to press the second tact switch.

9. The scroll key having a function selecting switch of claim 8, wherein the holder and the fixing part of the button are fixed on the base board in a manner that fixing projections respectively formed at lower parts thereof penetrate the FPC and the base board and are fused.

10. A scroll key having a function selecting switch, comprising:
    a circuit board having a circuit provided for a predetermined function;
    a vertical rotation switch mounted on the circuit board with a rotation axis thereof being substantially parallel with the circuit board;
    first and second tact switches mounted on the circuit board in alignment with the rotation axis of the vertical rotation switch;
    a rotation knob rotatably disposed between the vertical rotation switch and the first tact switch substantially in perpendicular relation to the circuit board to rotate the vertical rotation switch and press the first tact switch; and
    a button mounted on the circuit board to press the second tact switch,
        wherein the button comprises a guide part at one side fixed on the circuit board to guide the rotation and vertical movement of the rotation knob and is fixed by fusing on the circuit board by using a fixing projection formed at a lower part thereof.

11. A scroll key having a function selecting switch, comprising:
    a circuit board having a circuit provided for a predetermined function;
    a vertical rotation switch mounted on the circuit board with a rotation axis thereof being substantially parallel with the circuit board;
    first and second tact switches mounted on the circuit board in alignment with the rotation axis of the vertical rotation switch;
    a rotation knob rotatably disposed between the vertical rotation switch and the first tact switch substantially in perpendicular relation to the circuit board to rotate the vertical rotation switch and press the first tact switch; and
    a button mounted on the circuit board to press the second tact switch,
        wherein the second tact switch is used as the function selecting switch for selecting one from at least two predetermined functions, the vertical rotation switch performs a scroll function as selected by the second tact switch, and the first tact switch performs an enter function for confirming one of menus scrolled by the vertical switch.

12. A scroll key having a function selecting switch, comprising:
    a base board;
    a flexible printed circuit (FPC) placed on the base board and having a circuit provided for a predetermined function;

a vertical rotation switch mounted on the FPC with a rotation axis thereof being substantially parallel with the base board;

a rotation knob of which one end is mounted on the rotation axis of the vertical rotation switch to rotate the vertical rotation switch, and a rotation shaft that protrudes at the opposite end;

a first tact switch mounted on the FPC to be disposed under the rotation shaft of the rotation knob;

a holder mounted on the FPC to support the rotation of the rotation shaft above the first tact switch and enable the rotation shaft to press the first tact switch;

a second tact switch mounted on the FPC to be aligned with the first tact switch; and a button mounted on the FPC to press the second tact switch, wherein the button comprises:

a fixing part fixed between the holder and the rotation knob on the FPC; and a press part that extends from the fixing part to press the second tact switch.

13. The scroll key having a function selecting switch of claim 12, wherein the holder and the fixing part of the button are fixed on the base board in a manner that fixing projections respectively formed at lower parts thereof penetrate the FPC and the base board and are fused.

* * * * *